United States Patent Office 3,366,943
Patented Jan. 30, 1968

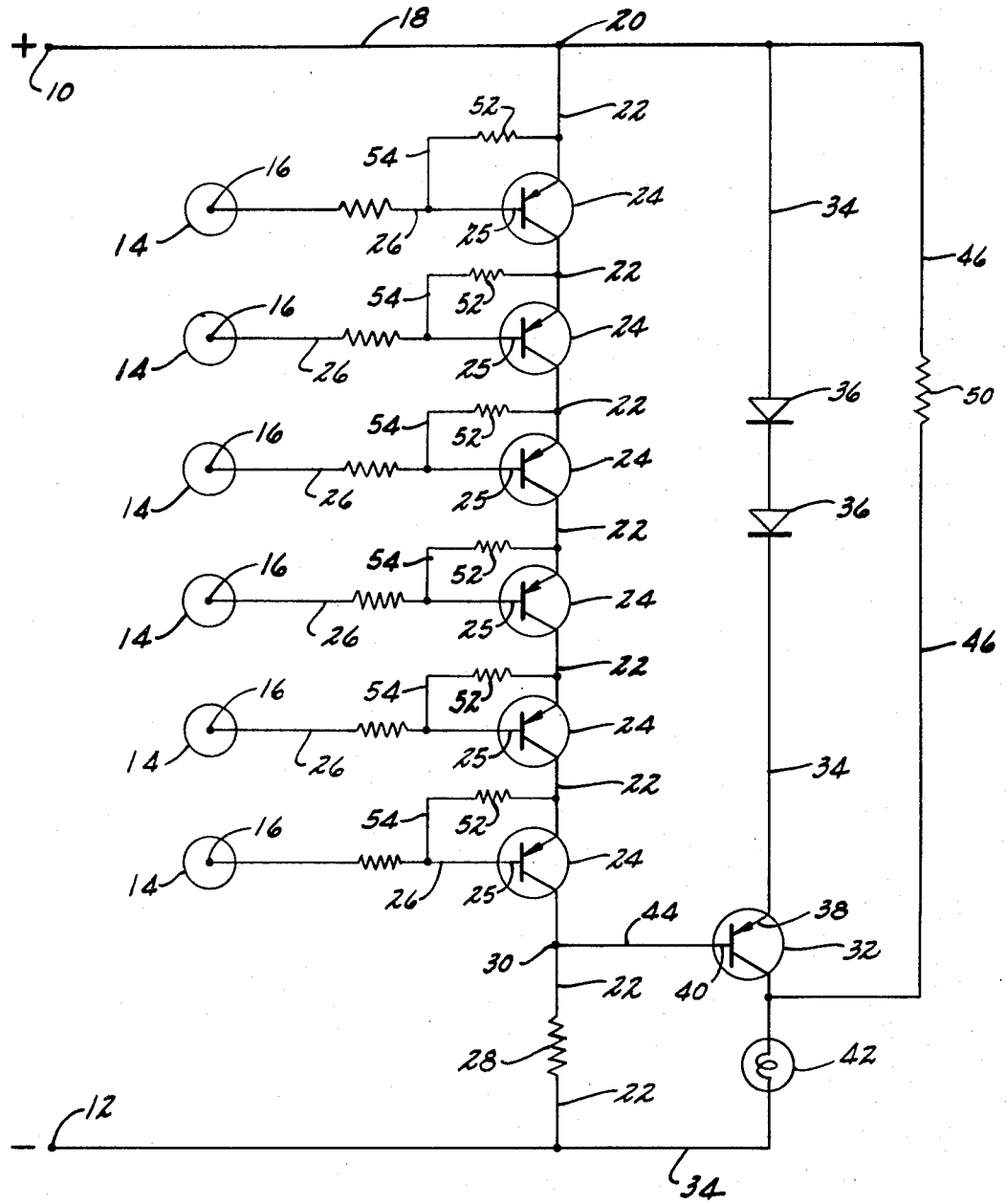

3,366,943
CURRENT INTERRUPTION DETECTION MEANS
Atlee S. Hart, Oak Park, Mich., assignor to American Radiator & Standard Sanitary Corporation, New York, N.Y., a corporation of Delaware
Filed Jan. 28, 1965, Ser. No. 428,686
7 Claims. (Cl. 340—249)

ABSTRACT OF THE DISCLOSURE

The invention proposes a liquid level detection mechanism comprising one or more liquid level probes individually connected with the bases of current sensing transistors, the emitter-collector circuits of said transistors being in a series circuit which normally prevents an indicator transistor from turning on. In the event the liquid level drops below a pre-determined value the series sensing circuit is interrupted so that it cannot then prevent turn-on of the indicator transistor.

---

This invention relates to means for detecting the flow of current through a device. It is particularly applicable in the field of liquid level detection wherein an electrically conductive probe is arranged to engage a body of conductive liquid to produce an interruption in a sensing circuit when the liquid drops from its normal level out of contact with the probe. The arrangement has special application in wet cell batteries as a means for detecting abnormally low electrolyte levels.

In the drawings the single figure is a diagram of an electric circuit employed in practicing the invention.

As shown in the diagram, there is provided a source of positive D.C. potential 10 which can be one terminal of a conventional twelve volt wet cell battery. The battery is provided with a negative terminal 12 and six electrolyte cells, each of which is closed by a filler cap 14. Extending downwardly through each cap is an electrically conductive probe rod or wire 16 having its lower end located at or somewhat above the upper edges of the plates in the respective cell. Each probe is connected with a sensor circuit such that normal electrolyte levels in all of the cells cause the probe to see a potential that is more negative than the potential at the emitter of the respective sensor transistor 24, thereby rendering the sensing circuit conductive. Abnormal drop in liquid level in any one of the cells disconnects the respective probe from the electrolyte and renders the sensor circuit non-conductive.

The sensor circuit comprises a line 18 having a connection 20 with a branch line 22 which interconnects the emitters and collectors of six similar sensor transistors 24. The base 25 of each sensor transistor is connected by a line 26 with the respective probe 16. Assuming a satisfactory liquid level in each cell of the battery, the base of each transistor and its probe 16 establishes a signal current which turns on the sensor circuit through each collector and emitter. The sensor circuit operates through a resistance 28 which establishes a proper operating current in transistors 24 and also limits the base current for transistor 32 when that transistor is conducting.

In the event any one of probes 16 is out of contact with electrolyte the respective transistor 24 becomes non-conductive. The various transistors are in series with one another so that the potential at junction 30 drops to substantially zero. This drop in potential is used to turn on an indicator transistor 32 which has its base 40 connected with junction 30 through a connector line 44. The emitter and collector of transistor 32 are located in an indicator line 34. As shown in the drawing, line 34 is in parallel with line 22 so that the supply voltage at junction 20 is the same for both lines.

Line 34 includes a pair of diodes 36 which are chosen to produce a predetermined voltage drop sufficient to make the potential at emitter 38 less than the potential at junction 30 and base 40 when sensor transistors 24 are conducting. Each sensor transistor has a predetermined potential drop thereacross, as for example .2 volt. In the case of a twelve volt battery we would therefore have a junction 30 potential of 10.8 volts, and diodes 36 would be chosen to produce a lower emitter 38 potential such as 10.5 volts. With such values the potential at base 40 prevents transistor 32 from being turned on; indicator lamp 42 is therefore in a darkened condition.

When transistors 24 become non-conductive the potential at junction 30 and base 40 drops to substantially zero, and the emitter-collector circuit of the indicator transistor becomes conductive, thereby energizing lamp 42 and appraising the maintenance man of an abnormally low electrolyte level in one or more of the battery cells.

The resistance of lamp 42 varies with temperature such that a damaging current surge may be produced through transistor 32 if the bulb is cold at the instant transistor 32 becomes conducting. To reduce the current surge lamp 42 may be constantly heated to an elevated temperature by a continually energized circuit which includes a line 46 and resistance 50. The heating current is such as to produce only a faint illumination of the lamp while raising the lamp filament resistance such as to reduce the current surge at the instant transistor 32 becomes conductive. The faint lamp illumination is chosen to be so slight as not to be mistaken for the true indication provided by a fully illuminated lamp.

Turning to another aspect of this invention, it is known that a transistor is never fully non-conductive when in its nominally non-conductive condition. Thus, some leakage currents exist in the emitter-collector stage when the transistor is in its nominally non-conducting condition. If transistors 24 and their temperature environments produce leakage currents large enough the sensor line 22 can remain conducting even though one or more of the probes 16 are out of contact with electrolyte. Such a condition can be prevented by providing a line 54 having a biasing resistor 52 between each transistor base 25 and its emitter. Each line 54 causes its respective base to be connected to the same potential as its emitter when the transistor is in the nominally non-conductive condition. This action effects a reduction in the collector-emitter leakage current sufficient to prevent transistor line 22 from remaining conductive when one or more of probes 16 are out of contact with electrolyte.

The invention can of course be employed with batteries having any number of cells. Further, the concept can be employed in any liquid level detection environment wherein the levels of one or more conductive liquids are desired to be monitored, providing the liquids are grounded through their containing receptacles. The drawing shows indicator line 34 arranged to energize a lamp 42. However the lamp could be replaced by another component such as a buzzer, bell, electromagnetic relay, or solenoid valve. The solenoid valve would find application in systems where the liquid level was intended to be automatically replenished by energization of the valve solenoid.

In addition to liquid level detection it is conceivable that the invention could be employed in other environments wherein variations in a condition are translatable into an electric signal. Thus, such conditions as fluid pressure, temperature and humidity can be translated into low level interruptable signals, and the interruptable signals can be applied to transistors 24 to provide an amplified indication of the interruption by means of the transistor 32. On any of the contemplated environments the invention is particularly advantageous because it requires only a small signal current to produce a rather large indicator current.

What is claimed:

1. A liquid level detector comprising a series of separate liquid-level probes adapted to engage separate electrically conductive liquids; a source of positive D.C. potential; a sensor circuit connected with said source; separate sensor transistors, one for each probe; the sensor transistors having their collectors and emitters in series with one another in the sensor circuit, and having their bases connected with the respective probe whereby the sensor circuit remains conductive as long as all of the probes are contacted by liquid; an indicator circuit connected with the source of D.C. potential in parallel with the sensor circuit; an indicator transistor having its collector and emitter located in the indicator circuit; and means connecting the base of the indicator transistor with the collector of the sensor transistor having the lowest potential, whereby the base potential of the indicator transistor is normally greater than the emitter potential to render the indicator circuit normally non-conductive.

2. A liquid level detector comprising a series of separate liquid level probes adapted to individually engage separate electrically conductive liquids; a source of D.C. potential; a sensor circuit connected with said source; separate sensor transistors, one for each liquid; the sensor transistors having their collectors and emitters in series with one another in the sensor circuit, and having their bases connected with the respective probes whereby the sensor circuit remains conductive as long as all of the probes are contacted by liquid; an indicator circuit connected with the source of D.C. potential in parallel with the sensor circuit; an indicator transistor having its emitter and collector in said indicator circuit; means connecting the base of the indicator transistor with the sensor circuit at a location therein between the sensor transistors and ground; and means causing the potential at the indicator transistor emitter to be less than the potential at the base of the indicator transistor when the sensor circuit is conductive; whereby when the sensor circuit is non-conductive the base potential of the indicator transistor drops below the emitter potential to render the indicator circuit conductive.

3. A liquid level detector comprising at least one liquid level probe adapted to engage at least one electrically conductive liquid; a source of D.C. potential; a sensor circuit connected with said source; sensor transistor means including at least one sensor transistor, the number of sensor transistors corresponding to the number of probes; each sensor transistor having its collector and emitter in the sensor circuit, and having its base connected with the respective probe, whereby the sensor circuit remains conductive as long as each probe is contacted by liquid; an indicator circuit connected with the source of D. C. potential in parallel with the sensor circuit; an indicator transistor having its emitter and collector in said indicator circuit; a connector circuit between the base of the indicator transistor and a point in the sensor circuit located between the sensor transistor means and ground; and means causing the potential at the indicator transistor emitter to be less than the potential at the base of the indicator transistor when the sensor circuit is conductive; whereby when the sensor circuit is non-conductive the base potential of the indicator transistor drops below the emitter potential to render the indicator circuit conductive.

4. The combination of claim 3 wherein the potential-causing means comprises at least one diode arranged in the indicator circuit between the source and indicator.

5. The combination of claim 3 and further comprising an indicator lamp in the indicator circuit in series with the indicator transistor collector.

6. The combination of claim 3 and further comprising a resistance in the sensor circuit between the aforementioned point and ground.

7. In a battery having a series of separate electrolyte cells; a series of electrolyte probes arranged to individually engage individual electrolytes; a source of D.C. potential; a sensor circuit connected with said source; separate sensor transistors, one for each probe; the sensor transistors having their collectors and emitters in series with one another in the sensor circuit, and having their bases connected with the respective probes, whereby the sensor circuit remains conductive as long as all of the probes are contacted by electrolyte; an indicator circuit connected with the source of D.C. potential in parallel with the sensor circuit; an indicator transistor having its emitter and collector in said indicator circuit; a connector circuit between the base of the indicator transistor collector of the sensor transistor having the lowest potential; and means causing the potential at the indicator transistor emitter to be less than the potential at the indicator transistor base when the sensor circuit is conductive.

References Cited

UNITED STATES PATENTS 3,293,630  12/1966  McKaig _____ 340—248

THOMAS B. HABECKER, *Acting Primary Examiner.*

NEIL C. READ, *Examiner.*

D. K. MYER, *Assistant Examiner.*